June 28, 1949.   R. L. BURDEN   2,474,343
FLY REEL SEAT
Filed June 23, 1945

Inventor
Royal L. Burden

By Clarence A. O'Brien
and Harvey B. Jacobson
Attorneys

Patented June 28, 1949

2,474,343

UNITED STATES PATENT OFFICE 2,474,343

FLY REEL SEAT

Royal L. Burden, Springfield, Ohio, assignor of one-eighth to Russell L. Dix, Springfield, Ohio, and one-eighth to Tira Q. Dix, Dayton, Ohio Application June 23, 1945, Serial No. 601,183

2 Claims. (Cl. 43—4)

This invention relates to fishermen's appliances and has for its object to provide a body seat for a fish line reel.

Another object of the invention is to provide means for supporting a fishing reel upon the belt of a fisherman whereby a more convenient manipulation of a fishing rod may be had and more accurate casting assured.

A further object of my invention is to provide means for supporting a fishing reel independently of a fishing rod.

A still further object of this invention is to provide means for independent support of a reel disconnected from the fishing rod whereby a single rod will answer the purpose of a casting rod and a fly rod, thus altogether doing away with one unnecessary rod.

Another object of my invention is to provide a very simple, light, inexpensive reel support, the use of which will require no change in the construction of the reels now commonly on the market, as is the case with other independent reel supports of which I have been able to gain any knowledge.

Other features and advantages will become more readily apparent from the following description and the accompanying illustrative drawings in which.

Figure 2:
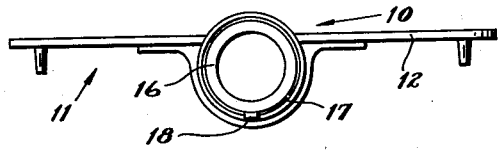
Figure 2 is a top plan view thereof.
Figure 5:
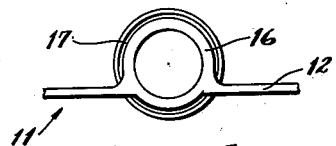
Figure 5 is a view taken on line 5—5 of Figure 1.
Figure 1:
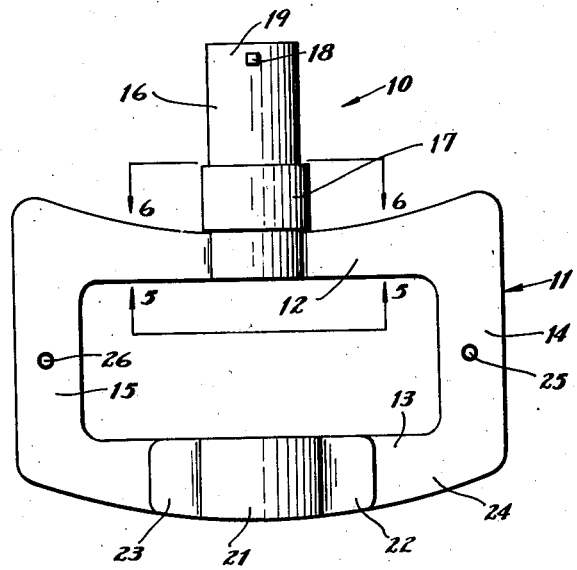
Figure 1 is an elevational view of my reel seat.

In the following specification as in the accompanying drawings, I use the same reference characters to designate the same elements throughout and in which 10, indicates my fly reel support. This device is of buckle like formation as indicated. The body member 11 is preferably cast from aluminum or some other suitable material and is provided with a pair of horizontally disposed bars 12 and 13, spaced and integrally connected by vertical side bars 14 and 15.

Integrally formed on the upper bar 12, of member 11, and projecting forwardly thereof is a tube 16, upon which is slidably mounted a collar 17, held against displacement from the tube by a pin 18, projecting from the upper edge 19, of said tube 16. The bottom bar 13, of member 11, is centrally turned outwardly to form a semi-cylinder 20, of a diameter equivalent to that of and aligning with the tube 16, the diameter of both of which approximates that of the portion of a fishing rod to which a reel is usually attached.

Seated around and slightly spaced from the member 20, is a similarly formed member 21, of slightly larger diameter and which is provided with terminal flanges 22 and 23, integrally fixed to the face 24, of bar 13. Projecting from the outer face 24, of member 11, and intermediate said bars 14 and 15, are pins 25 and 26, slightly tapering to the points 27 and 28, for ease in inserting them into spaced apertures 29 and 30, in a belt 31, which may be any belt ordinarily worn by a sportsman in which said apertures may be made. These pins 25 and 26, together with entire device are held in place by pressure of the belt and the body of the user, between which the device is to be seated.

Figure 4:
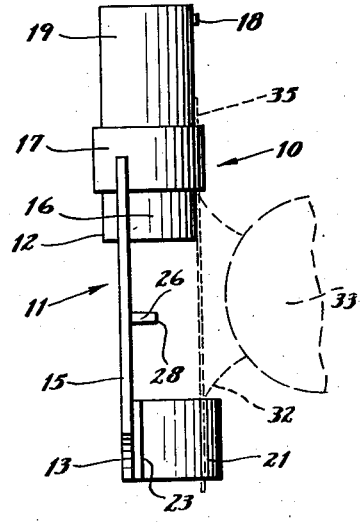
Figure 4 is a side elevational view of the invention.
Figure 3:
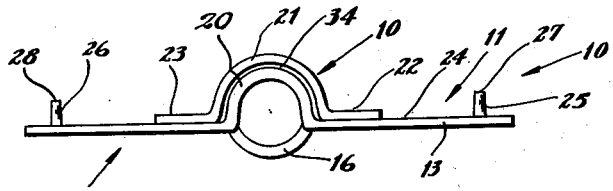
Figure 3 is a bottom plan view of the device.
Figure 6:
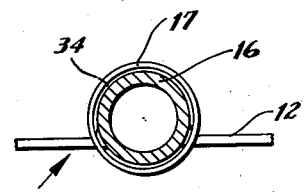
Figure 6 is a sectional view taken on line 6—6 of Figure 1.
Figure 7:
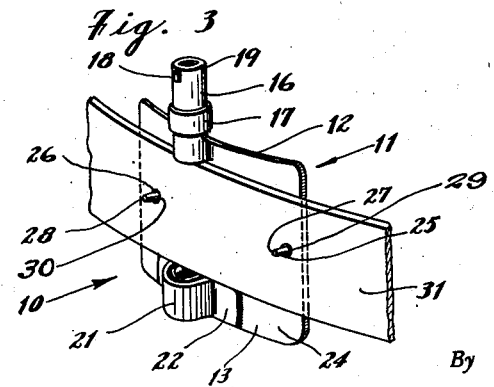
Figure 7 is a perspective view, shown attached to a belt.

After the device is attached to the belt it requires only a moment to attach thereto or remove therefrom a fly reel it being only necessary to slide the flange or pin 32, of a reel 33, into the space 34, between elements 20 and 21, raise collar 17, and place pin 35, against tube 16, and drop the collar over pin 35, and the reel is securely affixed to the device. The elements 32, 33 and 35, are shown dotted in Figure 4, of the drawings. Attention is called to one particular advantage of my device over others of a similar nature and that is that a desired adjustment of the angle of the reel to the body of the user may be instantly made by pivotally moving the reel upon its arcuate supports. This is a decided advantage as each user may adjust the reel from time to time according to conditions as they arise.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention, that which I claim as new and desire to procure by Letters Patent is:

1. A fly reel seat comprising a substantially flat base, a tube projecting from one side thereof, a semi-cylindrical member projecting from the opposite side thereof, a slidable collar on the tube, a second semi-cylindrical member surrounding said first semi-cylindrical member and spaced therefrom, said collar being of larger diameter than the tube upon which it operates, and a lug extending laterally from said tube for engagement by said slidable collar to limit the travel of said collar on said tube.

2. A fly reel seat comprising a substantially rectangular flat base, a tube projecting from one side and the front surface thereof, a semi-cylindrical member projecting from the opposite side and the same surface thereof, a slidable collar on said tube and a second semi-cylindrical member surrounding said first semi-cylindrical member, said second member being in predetermined spaced relation to said first member, and means extending laterally from said tube for limiting the movement of said slidable collar on said tube.

ROYAL L. BURDEN.

REFERENCES CITED

The following references are of record in the file of this patent:

UNITED STATES PATENTS

| Number | Name | Date |
|---|---|---|
| 333,135 | King | Dec. 29, 1885 |
| 726,015 | Becroft | Apr. 21, 1903 |
| 1,013,347 | Wetzel | Jan. 2, 1912 |
| 1,154,123 | Manning | Sept. 21, 1915 |
| 1,711,248 | Powell | Apr. 30, 1929 |
| 1,994,171 | Dennison | Mar. 12, 1935 |
| 2,101,174 | Grahame | Dec. 7, 1937 |
| 2,361,189 | Fratt | Oct. 24, 1944 |